US008745481B1

(12) United States Patent
Ulm

(10) Patent No.: US 8,745,481 B1
(45) Date of Patent: Jun. 3, 2014

(54) AGGREGATING CONTENT FROM MULTIPLE SERVICES

(75) Inventor: Joshua S. Ulm, San Rafael, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1436 days.

(21) Appl. No.: 12/038,506

(22) Filed: Feb. 27, 2008

(51) Int. Cl.
*G06F 17/21* (2006.01)
*G06F 17/22* (2006.01)

(52) U.S. Cl.
CPC .......... *G06F 17/211* (2013.01); *G06F 17/2247* (2013.01)
USPC ........... 715/209; 715/201; 715/202; 715/205; 715/235; 715/243; 715/248; 715/249

(58) Field of Classification Search
CPC ... G06F 17/211; G06F 17/2247; G06F 17/30; G06F 17/30011; G06F 17/30864; G06F 17/30867; G06F 17/30905; H04L 67/306
USPC ......... 715/209, 201, 202, 205, 235, 243, 248, 715/249
See application file for complete search history.

(56) References Cited

U.S. PATENT DOCUMENTS

| | | | |
|---|---|---|---|
| 6,243,398 B1 | 6/2001 | Kahane et al. | |
| 6,711,158 B1 | 3/2004 | Kahane et al. | |
| 6,714,519 B2 | 3/2004 | Luzzatti et al. | |
| 7,673,327 B1 * | 3/2010 | Polis et al. | 726/5 |
| 7,734,606 B2 * | 6/2010 | Walker | 707/705 |
| 7,752,552 B2 * | 7/2010 | Pennington et al. | 715/751 |
| 7,752,553 B2 * | 7/2010 | Pennington et al. | 715/751 |
| 7,840,903 B1 * | 11/2010 | Amidon et al. | 715/757 |
| 7,958,459 B1 * | 6/2011 | Mahmood et al. | 715/808 |
| 8,364,540 B2 * | 1/2013 | Soroca et al. | 705/14.64 |
| 2003/0146939 A1 * | 8/2003 | Petropoulos et al. | 345/810 |
| 2006/0242234 A1 * | 10/2006 | Counts et al. | 709/204 |
| 2007/0112762 A1 * | 5/2007 | Brubaker | 707/5 |
| 2007/0192299 A1 * | 8/2007 | Zuckerberg et al. | 707/3 |
| 2007/0233736 A1 * | 10/2007 | Xiong et al. | 707/104.1 |
| 2008/0052371 A1 * | 2/2008 | Partovi et al. | 709/217 |
| 2008/0182563 A1 * | 7/2008 | Wugofski et al. | 455/414.2 |
| 2009/0119299 A1 * | 5/2009 | Rhodes | 707/9 |
| 2010/0274815 A1 * | 10/2010 | Vanasco | 707/798 |

OTHER PUBLICATIONS

Liz Gannes; FriendFeed Syndicates Your Life; Oct. 3, 2007; GigaOM; pp. 1-12.*
Philipp Lenssen; FriendFeed: Track Your Friend's Web Activities; Oct. 4, 2007; Blogoscoped; pp. 1-3.*

(Continued)

*Primary Examiner* — Andrew Dyer
(74) *Attorney, Agent, or Firm* — Kilpatrick Townsend & Stockton LLP

(57) ABSTRACT

An exemplary embodiment involves receiving, by a processor, a selection of a contact from a requestor. The exemplary embodiment further involves identifying, by the processor, multiple services to which the contact subscribes and to which the requestor subscribes. Subscribing to each service comprises creating a profile comprising authentication information and associating with the profile one or more content items provided by the service. Identifying the multiple services comprises identifying, for each service that a first profile of the contact is associated with a second profile of the requestor. The exemplary embodiment further involves communicating, by the processor, with the multiple services to identify content to identify content that is provided by one or more of the multiples services and that is associated with the contact. The exemplary embodiment further involves generating, by the processor, a preview indicating the content associated with the contact.

21 Claims, 9 Drawing Sheets

(56) References Cited

OTHER PUBLICATIONS

Steve O'Hear; Spokeo, a Social Network Aggregator; Jan. 26, 2007; ZDNet; pp. 1-3.*

Vince Veneziani; Spokeo Aggregates Social Networks and Blogs; Nov. 29, 2006; TechCrunch; pp. 1-2.*

Matt Marshall; Spokeo—Integrates MySpace, Facebook, Flickr and More; Nov. 29, 2006; VentureBeat; pp. 1-4.*

John Markoff; Service Helps Friends Share Their Online Discoveries; Oct. 1, 2007; New York Times; pp. 1-2.*

Stan Schroeder; 20 Ways to Aggregate Your Social Networking Profiles; Jul. 17, 2007; Mashable.com; pp. 1-6.*

Myspace Layouts, Myspace Codes, Myspace Generators; FreeCodeSource.com; Aug. 22, 2006; pp. 1-3.*

Matt Cutts; Review: Google Reader; Mattcutts.com; Sep. 29, 2006; pp. 1-21.*

Budd et al.; CSS Mastery: Advanced Web Standards Solutions; Feb. 2006; Apress Publishing; pp. 13, 14, 117, and 18.*

* cited by examiner

400 PREVIEW CONFIGURATION

410-1 CONTACT

420-1 SERVICE
- CONTENT TYPE 430-1
  - PREVIEW 440-A
  - PREVIEW 440-B
- CONTENT TYPE 430-2
  - PREVIEW 440-C
  - PREVIEW 440-D 420-2 SERVICE
- CONTENT TYPE 430-1
  - PREVIEW 440-A
  - PREVIEW 440-E
- CONTENT TYPE 430-2
  - PREVIEW 440-G
  - PREVIEW 440-D

. . .

410-2 CONTACT

420-1 SERVICE
- CONTENT TYPE 430-1
  - PREVIEW 440-F
  - PREVIEW 440-B
- CONTENT TYPE 430-2
  - PREVIEW 440-C
  - PREVIEW 440-H 420-3 SERVICE
- CONTENT TYPE 430-2
  - PREVIEW 440-G
  - PREVIEW 440-H
- CONTENT TYPE 430-3
  - PREVIEW 440-J
  - PREVIEW 440-K

. . .

405 PREVIEW CONFIGURATION

410-1 CONTACT

CONTENT TYPE 430-1
- PREVIEW 440-A (SVC1/2)
- PREVIEW 440-B (SVC1)
- PREVIEW 440-E (SVC2)

CONTENT TYPE 430-2
- PREVIEW 440-C (SVC1)
- PREVIEW 440-D (SVC1/2)
- PREVIEW 440-G (SVC2)

. . .

410-2 CONTACT

CONTENT TYPE 430-1
- PREVIEW 440-B (SVC1)
- PREVIEW 440-F (SVC1)

CONTENT TYPE 430-2
- PREVIEW 440-C (SVC1)
- PREVIEW 440-G (SVC3)
- PREVIEW 440-H (SVC1/3)

CONTENT TYPE 430-3
- PREVIEW 440-J (SVC3)
- PREVIEW 440-K (SVC3)

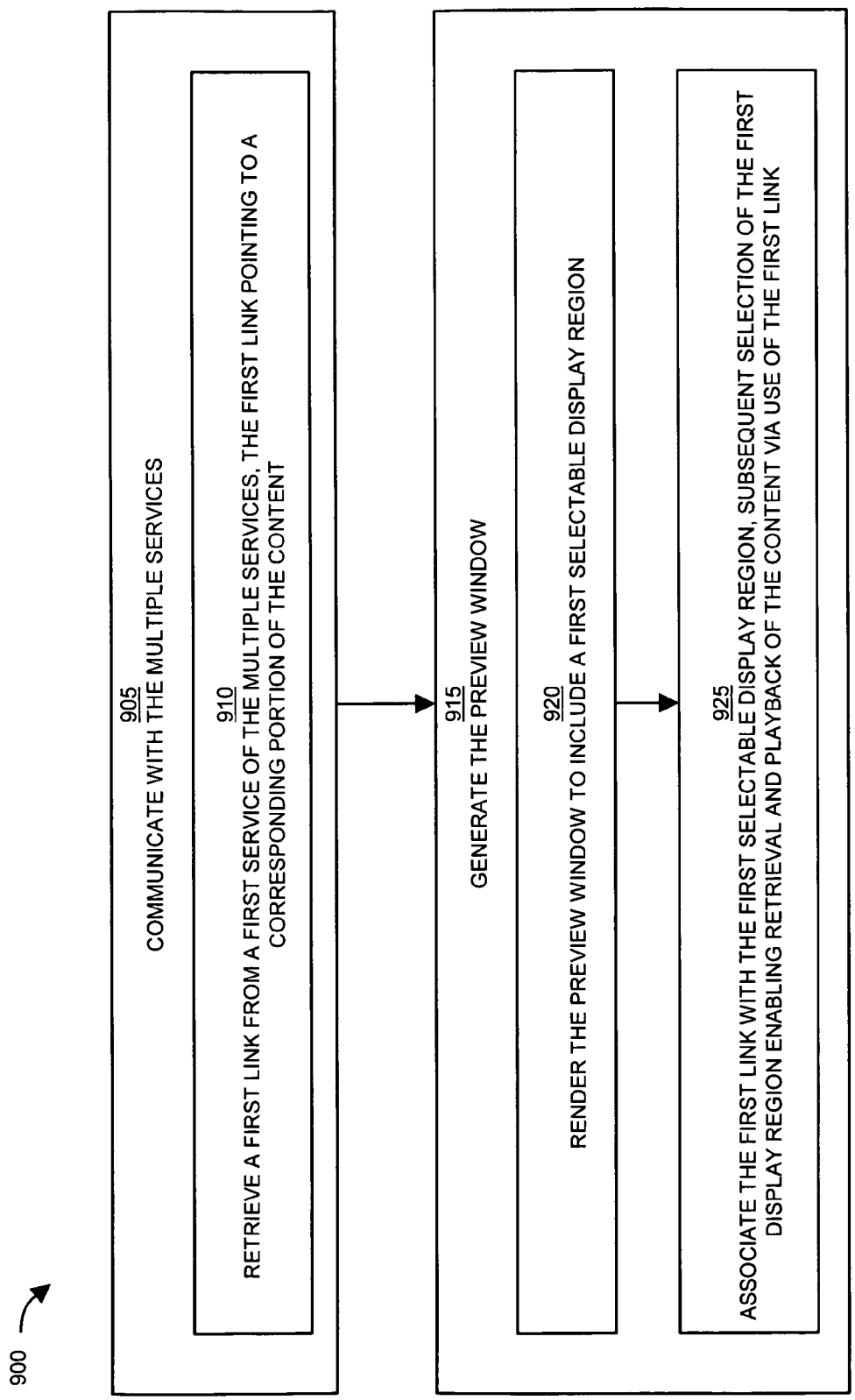

AGGREGATING CONTENT FROM MULTIPLE SERVICES

RELATED APPLICATION

This application is related to U.S. patent application Ser. No. 12/038,480 entitled "CONTACT INFORMATION MANAGEMENT," filed on the same day as the present application, the entire teachings of which are incorporated herein by this reference.

BACKGROUND

The web has developed dramatically over the past several years. It is now easier than ever for persons all around the world to communicate with each other and exchange personal information.

For example, social networking websites are popular ways of enabling persons having similar interests or activities to easily communicate with each other over the world wide web. Social networking services are primarily web-based and provide numerous ways for users to interact with each other. Modes of communicating as supported by a social networking service can include chatting, messaging, emailing, video playback, voice chatting, file sharing, blogging, discussion groups, and so on.

Certain social networking services enable a user to maintain a directory of contacts so that, upon visiting the social networking website, the user can keep track of his or her friends. Depending on the service, a directory can include identities of persons such as a group of former classmates, persons that are part of a club, chat room friends, etc. Thus, at least one service provided by a social networking website is the ability to manage a directory of friends or relations that also subscribe to the service. A respective service typically maintains a directory of "friends" for a corresponding subscriber as a private collection of contact information accessible only by the subscriber.

Although the directory of friends may be private, the personal information associated with the persons listed in a directory may be publicly available.

In certain cases, a user of a respective service needs a user name and password to log onto a social networking service. After authentication of the user by the service, the user can have access to his or her directory of friends. Thus, social networking services may provide at least some level of protection for private information even though subscribers' profiles are typically publicly available.

In addition to providing access to and use of a directory of friends, a social networking service can be configured to enable each of the users of the service to create a corresponding user profile (e.g., a web page of information) that is accessible by other users of the social networking service. Each subscriber can modify his or her profile to include personal or favorite information associated with the corresponding subscriber. As mentioned above, the profile information for each of the subscribers of the service may be publicly available to other users of the social networking service. In certain cases, a user profile can include contact information such as telephone, e-mail address, etc. for contacting the user. Special privileges may be required to access the contact information.

A user profile can also include accessible content or content links which the user has chosen to include as a part of his or her profile. For example, a profile can include text such as blogs, personal information, links to other web pages, etc. The content may also include various media, or links thereto, such as audio, video, FLASH® media files, and so on.

Upon visiting a social networking service, a user can access his or her directory of friends. If desired, the user can view profile information associated with the persons listed in the user's directory of friends by retrieving an information page associated with the selected friend or friends.

SUMMARY

Conventional management of content and content links suffer from a variety of deficiencies. For example, currently there is no efficient way for a user to manage and view content associated with multiple contacts that subscribe to multiple different networking services other than to manually and separately visit each site and, if desired, manually retrieve the content and/or links associated with a given contact for playback. Manually accessing content such as web pages, audio clips, video clips, links, etc., associated with multiple contacts from multiple different services can be very tedious and time-consuming.

Techniques discussed herein deviate with respect to conventional applications. For example, as will be discussed further, certain specific embodiments herein are directed to a computer and/or network environment in which a user has access to content information associated with different contacts via use of a content information aggregator having access to multiple remote services. As will be discussed, the content information aggregator simplifies a user's online experience by enabling the user to more easily view, analyze, interact with, etc., content information associated with his or her contacts.

In a general example embodiment, a content information aggregator receives selection of a contact. In response to selection of the contact, the content information aggregator identifies multiple services to which the contact subscribes. The content information aggregator communicates with the multiple services to retrieve content information associated with the contact. By way of a non-limiting example, the content information can include content and content references available from the contact's profile information residing at the multiple different services. The content information can specify content stored at locations other than the multiple services as well. The content information aggregator retrieves the content information from such services and potentially content and/or reference to content from the sources other than the multiple services.

After identifying different content information associated with the contact, the content information aggregator generates a preview based on the content information associated with the contact. The preview can include a display of the content information associated with the contact such as the contact's favorite URL (Uniform Resource Locator) links, selectable thumbnails representing retrievable content associated with contact, content associated with the contact, etc.

In one embodiment, the aggregator enables a viewer to initiate play back of content associated with the contact based on input commands with respect to the preview. For example, a viewer can select different display regions of the preview to initiate retrieval and playback of corresponding content associated with the contact. Such an embodiment is useful because, rather than having to manually visit each of multiple different websites (e.g., MySpace™, Facebook™, etc.) to identify content information associated with a contact, a user can use the content information aggregator as described herein to visit one or more services to obtain content information associated with a selected contact and thereafter play back or view content associated with the selected contact.

Thus, based on these and other embodiments as further described herein, a user can more efficiently manage content information associated with one or more contacts having content information stored at multiple disparate locations over a network. As will be discussed, the content aggregator can support additional functions other than just content information aggregation and generation of a preview. Accordingly, the content aggregator also can be considered a content information manager.

Embodiments herein provide useful ways for managing information. For example, according to embodiments herein, a subscriber can quickly view which content his or her friends have also been viewing or content in which his or her friends have indicated as being of interest Inherently, a user is likely to have similar tastes and preferences as his or her friends. Based on this premise, certain embodiments herein enable a user to conveniently view a preview of content that has been identified as preferred or enjoyable content by one or more of the user's contacts. Thus, embodiments herein can provide a more efficient online experience by mitigating the need to blindly peruse the Internet in an attempt to find enjoyable content.

Note that embodiments herein can include a configuration of one or more computerized devices, websites, hosted services, workstations, handheld or laptop computers, or the like to carry out and/or support any or all of the method operations disclosed herein. In other words, one or more computerized devices or processors can be programmed and/or configured to include a content information aggregator and/or related functions as explained herein to carry out different embodiments of the invention.

Another embodiment of the present disclosure is directed to a computer program product that includes one or more tangible computer readable media having instructions stored thereon for supporting operations such as retrieval and display of content information associated with a subscriber's contacts. The instructions, and thus method as described herein, when carried out by a processor of a respective computer device, cause the processor to: i) receive a selection of a contact; ii) identify multiple services to which the contact subscribes; iii) communicate with the multiple services to identify content associated with the contact; and iv) generate a preview to indicate the content associated with the contact.

Of course, the numbering of the above steps has been added for clarity sake, these steps may not need to be performed in any particular order.

Also, it is to be understood that each of the systems, methods, etc., herein can be embodied strictly as a software program, as a hybrid of software and hardware, or as hardware alone such as within a processor, or within an operating system or within a software application, or via a non-software application such a person performing all or part of the operations. Example embodiments of the invention may be implemented in products and/or software applications such as those manufactured by Adobe Systems Incorporated of San Jose, Calif., USA.

As discussed above, techniques herein are well suited for use in software applications supporting aggregation and playback of content associated with multiple contacts and multiple services. However, it should be noted that embodiments herein are not limited to use in such applications and that the techniques discussed herein are well suited for other applications as well.

Additionally, although each of the different features, techniques, configurations, etc., herein may be discussed in different places of this disclosure, it is intended that each of the concepts can be executed independently of each other or in combination with each other. Accordingly, the present invention can be embodied and viewed in many different ways.

Note also that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

FIG. 4 is an example diagram illustrating different configurations for displaying contact information associated with one or more contacts according to embodiments herein.

FIGS. 7-9 are flowcharts illustrating example methods for aggregation and management of content information according to embodiments herein.

DETAILED DESCRIPTION

According to embodiments herein, via a graphical user interface, a user can select a contact from a listing of multiple contacts. The listing of multiple contacts can be derived as a result of collecting contact information from multiple different services to which the user subscribes.

The contact selected from the listing can have content information available from one or more different services such as multiple social networking websites to which the selected contact subscribes. In response to selection of the contact from the listing, a content aggregator communicates with the multiple different services over a network to retrieve content information associated with the contact. By way of a non-limiting example, the retrieved content information from the multiple services can specify content, links, content references, etc., associated with the contact.

The content aggregator processes the content information from the multiple services and initiates display of the content information associated with the contact.

As further discussed below, aggregation and display of content information associated with a selected contact in this way enables a user to more easily view content associated with a contact than conventional methods which require the user to manually and individually visit each of multiple different social networking services to view such information.

Figure 1:
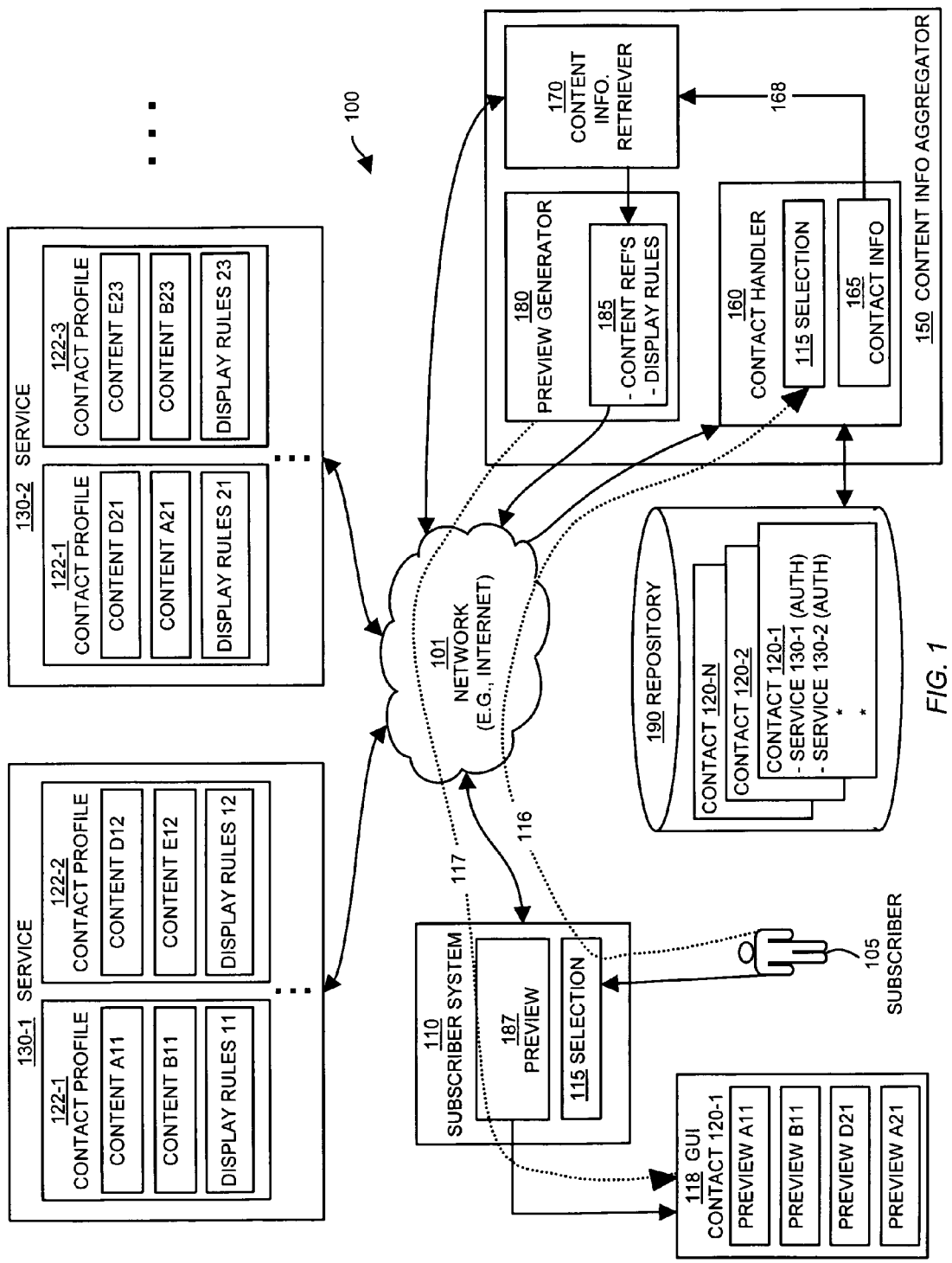
FIG. 1 is an example diagram of a network environment and aggregator for managing content information according to embodiments herein.

More specifically, FIG. 1 is an example diagram illustrating a network environment 100 supporting aggregation of content information and generation of preview information according to embodiments herein.

As shown, network environment 100 includes network 101, subscriber 105, subscriber system 110, graphical user interface 118, content information aggregator 150, repository 190, and services 130. Services 130 include service 130-1, service 130-2, and so on.

In the example configuration in FIG. 1, the content information aggregator 150 includes a contact handler 160, content information retriever 170, and preview generator 180. The repository 190 includes a listing of identified contacts 120 (e.g., contact 120-1, contact 120-2, . . . , contact 120-N) and associated services 130 to which the contacts subscribe. Additionally, each of the services 130 maintains at least one contact profile 122 associated with a corresponding contact 120. For example, contact profile 122-1 is associated with contact 120-1, contact profile 122-2 is associated with contact 120-2, . . . , contact profile 122-N is associated with contact 120-N. By way of a non-limiting example, each of the contact profiles 122 can represent personal information managed by a respective contact for rendering of a corresponding web page associated with a contact.

More specifically, each contact profile 122 can include content and corresponding display rules associated with its associated contact 120. As shown, contact 122-1 in service 130-1 can include content A11 and content B11. By way of a non-limiting example, the content as specified by a corresponding contact profile can include or provide a link to information such as video data, audio data, images, etc. Additionally, each contact profile 122 can include corresponding display rules indicating how to display the corresponding content associated with a profile when the profile and related information is displayed to a viewer.

Note that for the example configuration of FIG. 1, the content nomenclature is defined as follows: {Content ID, Service ID, Contact ID}. That is, for example, at least a portion of content associated with contact profile 122-1 in service 130-2 is denoted as content A21. The letter "A" in "A21" indicates a content ID of A. The number "2" in "A21" indicates a service ID of 2. The number "1" in "A21" indicates a contact ID of 1.

The display rules nomenclature is defined as follows: {Service ID, Contact ID}. Thus, as an example, the display rules for contact profile 122-2 in service 130-1 are denoted as display rules 12. The number "1" in "12" indicates a service ID of 1. The number "2" in "12" indicates a contact ID of 2. Details and use of the display rules are discussed further below with respect to FIGS. 4 and 5.

In a similar manner as discussed in related application Ser. No. 12/038,480 entitled "CONTACT INFORMATION MANAGEMENT", filed on a same day as the present application), the content information aggregator 150 of the current disclosure of FIG. 1 communicates with the services 130 to identify contacts associated with the subscriber 105. The content information aggregator 150 initiates display of a listing of the multiple contacts to the subscriber 105. The listing of contacts can be displayed in graphical user interface 118. Accordingly, the subscriber 105 can view identities of different contacts.

The subscriber 105 selects a contact from the listing of contacts. In this example, the selected contact 120-1 is denoted by selection 115. In turn, the subscriber system 110 transmits the selection 115 to the content information aggregator 150 over network 101. Logical path 116 represents transmission of the selection 115 to the content information aggregator 150.

Assume for this example embodiment that the selection 115 indicates that the subscriber 105 selected contact 120-1 for viewing of content information associated with selected contact 120-1.

The contact handler 160 of content information aggregator 150 receives and processes the selection 115 transmitted from subscriber system 110. In order to determine the services 130 associated with the selection 115, the contact handler 160 queries repository 190. The repository 190 in the example configuration of FIG. 1 maintains contact data that cross-references contacts 120 with his or her respective service 130 subscriptions. In other words, the repository 190 stores contact information indicating which different services to which the corresponding contacts subscribe. Based on this information, the content information aggregator 150 can identify which services 130 to initiate communications for retrieval of content information associated with a selected contact 120-1.

In the present example, the data entry for contact 120-1 in repository 190 indicates that contact 120-1 subscribes to service 130-1 and 130-2. Each of these identified services therefore should have corresponding content information associated with the contact 120-1.

To retrieve content information from a respective service for the selection 115, the content information aggregator 150 may need password and username information. In one embodiment, the repository 190 includes appropriate authentication information such as, without limitation, a username, password, etc., for each service 130 so that the content information aggregator 150 can gain access to content information at the different services 130 for the selection 115. In such an embodiment, the authentication information can be the same information that a the subscriber 105 would manually log onto a respective service and view, via a web browser, profile information associated with the selected contact.

Assume in this example that the contact handler 160 of the content information aggregator 150 accesses repository 190 and identifies that the selected contact 120-1 has corresponding content information available from service 130-1 and service 130-2 as mentioned above. The contact handler saves this information as contact information 165.

The contact handler 160 makes the contact information 165 available to the content information retriever 170. By way of a non-limiting example, the contact information 165 can include an identity of the selection 115, the identity of any associated services 130 associated with the contact, pointer or location address for each service 130, authentication information for each service 130, etc.

As its name suggests, the content information retriever 170 retrieves content information associated with the selection 115. Thus, based on use of the contact information 165, the content information retriever 170 is able to identify, locate, and log on to the specific services associated with the selection 115.

Typically, each service 130 has an Application Programming Interface (API) that enables the content information aggregator 150 to communicate with and access content from each service.

Recall in this example that contact profile 122-1 represents content information associated with contact 120-1. Content information associated with the selection 115 is therefore available from both service 130-1 and service 130-2.

Based on the contact information 165, the content information retriever 170 communicates with each of services 130-1 and 130-2 to retrieve content information associated with the selection 115. For example, the content information retriever 170 requests service 130-1 to provide content information associated with the selection 115. The content information retriever 170 also requests service 130-2 to provide content information associated with the selection 115. By way of a non-limiting example, the content information can include any content information associated with the selection 115 such as links to information associated with the contact 120-1 such as the contact's favorite web pages, links to retrievable content, playable content, metadata, audio files, video files, display rules indicating how to present content information to a viewer, etc.

In this example, the content information retriever 170 can retrieve any or all of the content information associated with the selection 115 such as content A11, content B11, display rules 11, content D21, content A21, display rules 21, etc., from the services as specified by contact information 165.

In response to retrieving the content information from the services 130, the content information retriever 170 stores the retrieved content information as content information 185. The preview generator 180 utilizes the content information 185 as retrieved from services 130 to create a preview 187 for viewing by the subscriber 105. Logical path 117 in FIG. 1 indicates transmission of any data required to initiate display of preview 187 on graphical user interface 118.

Upon receiving the preview 187, the subscriber system 110 renders preview information such as preview A11, preview B11, preview D21, and preview A21, etc., in graphical user interface 118.

Preview A11 displayed in graphical user interface 118 represents a preview of content A11 associated with the selected contact 120-1 as retrieved from service 130-1, preview B11 represents a preview of content B11 associated with the selected contact 120-1 as retrieved from service 130-1, preview D21 represents a preview of content D21 associated with the selected contact 120-1 as retrieved from service 130-2, preview A21 represents a preview of content A21 associated with the selected contact 120-1 as retrieved from service 130-2, and so on.

Thus, in response to selection 115 of a particular contact such as contact 120-1, the content information aggregator 150 can initiate retrieval of content information associated with the selected contact 120-1 from multiple services. The content information aggregator 150 initiates, via preview generator 180, display of one or more previews of the content information associated with the selected contact 120-1 in graphical user interface 118.

Note that display rules for indicating how to display the content information in the previews can be obtained from a number of different sources such as the subscriber and/or contact. For example, the subscriber 105 can provide display rules indicating how to display content information associated with a selected contact.

As another example, the content information retriever 170 can retrieve, in addition to content information such as content and/or content links associated with the selection 115 as stored at services 130, the content information retriever 170 can retrieve display rules 11 and/or display rules 21 that have been pre-defined by the contact to be used for generating the preview of the contact's content in graphical user interface 118. Thus, the contact can have some control as to how to present the contact's content information to a viewer.

It should be appreciated that retrieval of content information associated with one or more contacts from multiple services, the content information aggregator 150 alleviates the need for the subscriber 105 to perform a piecemeal login to each of multiple different services 130 to manually retrieve content associated with a given contact for viewing.

As will be discussed further with respect to FIGS. 3-6, each preview can include selectable references that enable the subscriber 105 to choose which, if any, content associated with the contact the subscriber wishes to retrieve and view in their entirety. Thus, in one embodiment, the preview information displayed in graphical user interface 118 may only be a summary view specifying different content associated with a respective contact.

Figure 2:
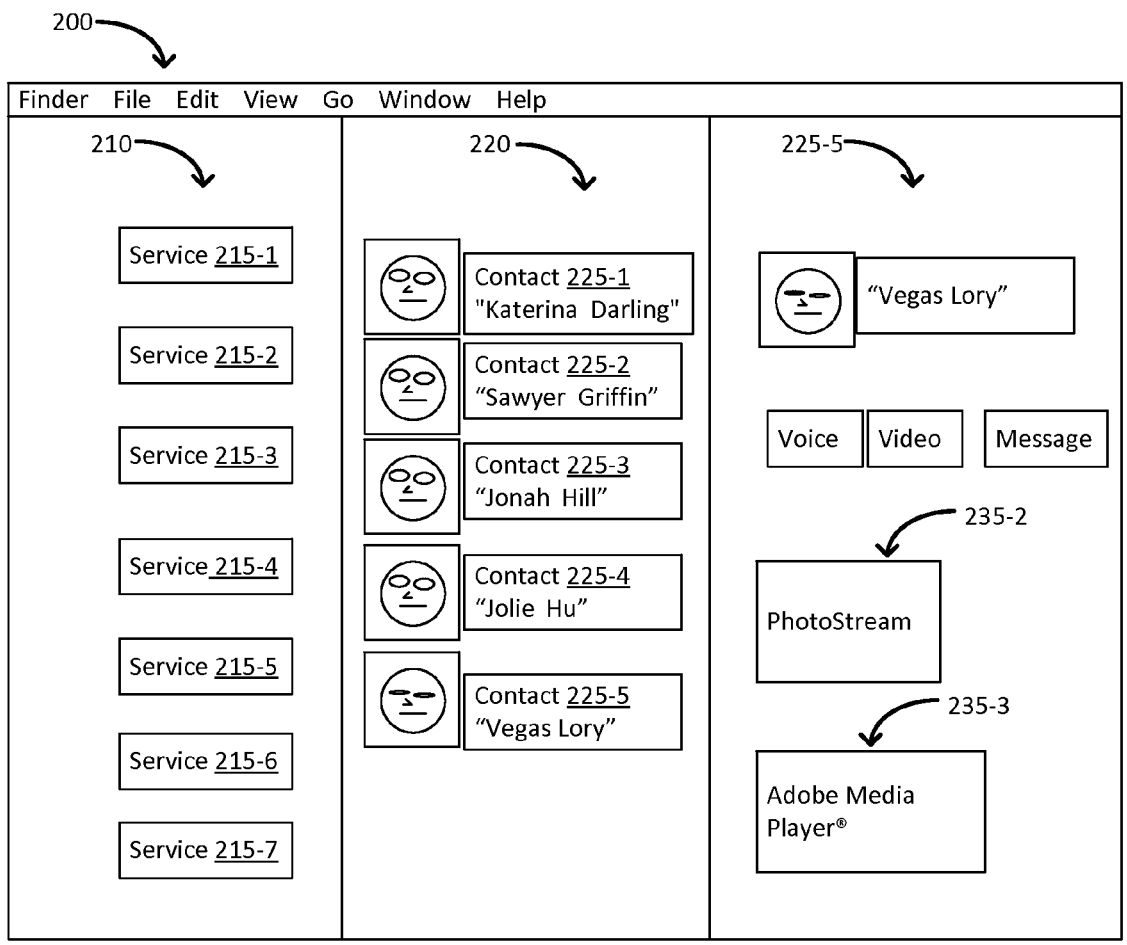
FIG. 2 is an example diagram of a screenshot illustrating multiple contacts that subscribe to one or more services according to embodiments herein.

FIG. 2 is an example screenshot 200 generated by the content information aggregator 150 in a graphical user interface 118 according to embodiments herein. Screenshot 200 includes a service list 210, a contact list 220, and a display region 225-5 having detailed information related to a contact selected from contact list 220.

As shown, service list 210 includes services 215. By way of a non-limiting example, service 215-1 can represent a service such as "FACEBOOK®"; service 215-2 can represent a service such as "MYSPACE®"; service 215-3 can represent a service such as "LINKEDIN®", and so on.

For those services 130 to which the subscriber 105 subscribes, the content information aggregator 150 communicates with each service to identify the subscriber's contacts at those services 130. This is described in related United States patent Application entitled "CONTACT INFORMATION MANAGEMENT," as incorporated by reference above.

In the context of the present example, contact list 220 includes contacts 225 such as contact 225-1 "Katerina Darling", contact 225-2 "Sawyer Griffin", contact 225-3 "Jonah Hill", contact 225-4 "Jolie Hu", contact 225-5 "Vegas Lory", and so on. These entries in contact list 220 represent different contacts that can be selected by the subscriber 105 for viewing corresponding content information. Each of the contacts in contact listing 220 can have corresponding content information stored at one or more of the same or different services as discussed above.

In the context of the example embodiment of FIG. 2, assume that the user has made selection 115 such as by clicking on contact 225-5 "Vegas Lory" in contact listing 220 in order to view the more detailed information regarding this contact.

In response to the selection 115 of contact 225-5 Vegas Lory from contact list 220, the subscriber system 110 sends the selection 115 to content information aggregator 150 as mentioned above in FIG. 1. Based on the selection 115, the content information aggregator 150 retrieves content information from services 130 subscribed to by Vegas Lory and then populates the corresponding display region 225-5 (in the screenshot 200 of FIG. 2) with content information associated with the selection 115, namely contact Vegas Lory in this example.

By way of a non-limiting example, display region 225-5 includes a first preview region 235-2 illustrating a preview of example photo content associated with Vegas Lory. Display region 225-5 includes a second preview region 235-3 including video content associated with Vegas Lory. To view content information associated with another contact, the subscriber makes another selection 115 such as by clicking on another contact in contact listing 220. Accordingly, the subscriber can view content information associated with any selected contact.

Figure 3:
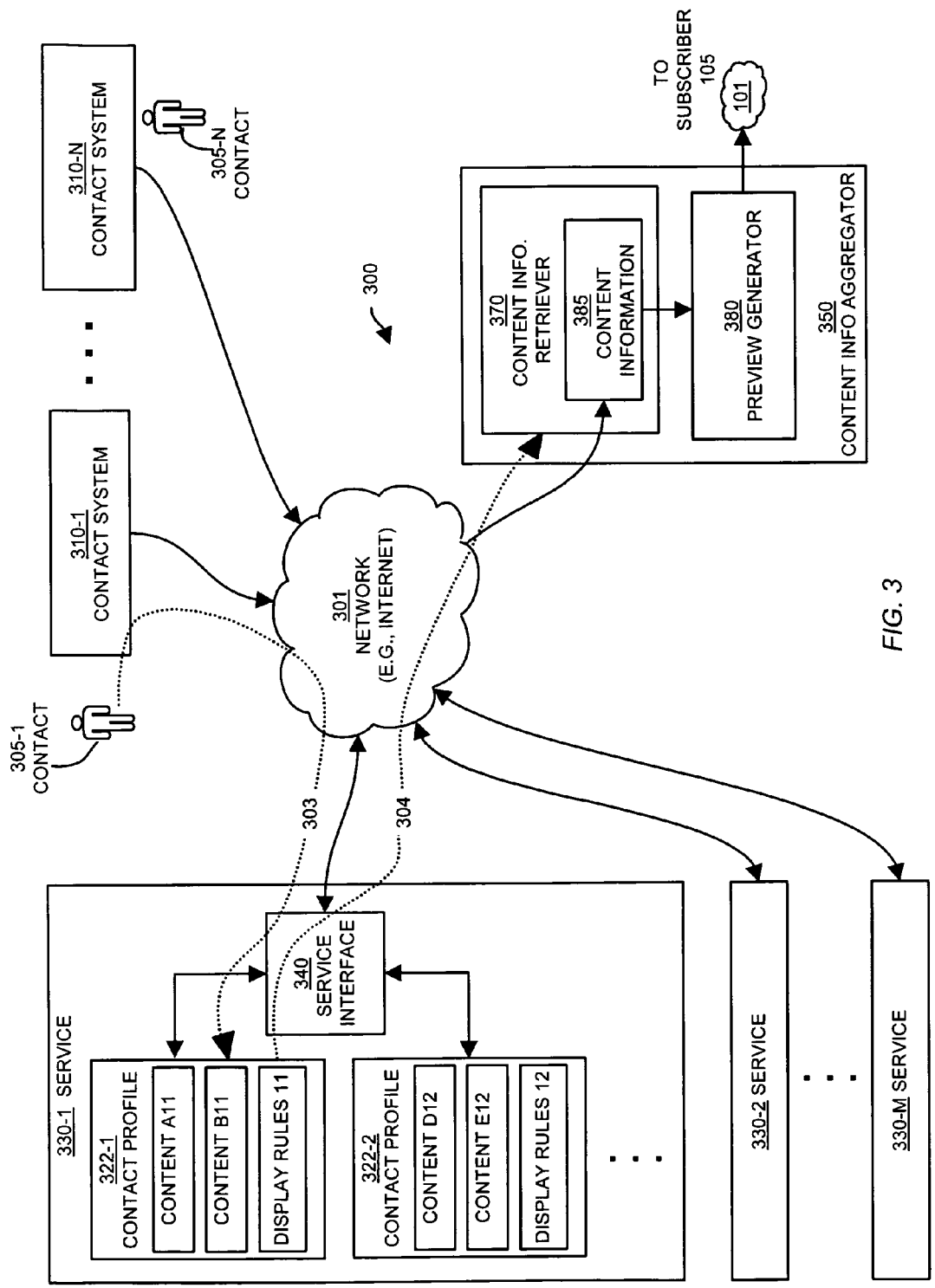
FIG. 3 is an example diagram of an aggregator and retrieving contact information associated with one or more contacts according to embodiments herein.

FIG. 3 is an example diagram further illustrating a network environment 300 supporting retrieval of content information for a selected contact according to embodiments herein.

As shown, network environment 300 includes network 301, contacts 305 (e.g., contact 305-1, . . . , contact 305-N) and associated contact systems 310. Contact systems 310 include contact system 310-1, . . . , contact system 310-N, such as a computer, laptop, workstation, etc., providing access to network 301 and services 330. Network environment 300 further includes content information aggregator 350 with associated content information retriever 370 and preview generator 380.

Services 330 include service 330-1, service 330-2, . . . , service 330-M. By way of a non-limiting example, the services 330 can represent social networking services, repositories, web pages, etc., through which the contacts manage and/or store his or her content information.

In the context of the present example, a contact 305 represents an entity that has a corresponding contact profile stored with a corresponding service. In other words, each of the contacts 305 subscribes to one or more services 330 that store content information associated with the respective contact. Such services 330 can be configured to enable the contacts users to manage his or her corresponding content information.

Via communications over network 301, a contact user 305 can upload and/or create content information for inclusion in his or her corresponding contact profile. For example, assume that a contact user uploads his or her favorite songs or movies (or links to his or her favorite songs or movies) to a corresponding MYSPACE® profile. By doing so, other users of the MYSPACE® service having access to the contact user's profile can identify which songs or movies are preferred by the contact user.

Thus, in the context of FIG. 3, contact user 305-1 provides, over network 301, content information including content A11, content B11, and display rules 11 to the contact user's corresponding contact profile 322-1 on service 330-1. Contact profile 322-2 includes content information associated with another contact in network environment 300.

In this particular embodiment, service 330-1 has a service interface 340 enabling the contacts 305 and subscriber 105 to access contact profiles 322 associated with different entities such as contacts 305. Logical path 303 represents a communications path enabling contact 305-1 to manage his or her content information in his or her respective contact profile 322-1 at service 330-1.

In a similar manner as discussed above for contact 305-1, each of the contacts 305 in network environment 300 can manage his or her profile information at the different services 330.

In accordance with the previous example embodiments, the content information retriever 370 of content information aggregator 350 communicates with the appropriate services associated with a given contact to retrieve content information associated with the contact. For example, the content information retriever 370 communicates with service 330-1 to access contact profile 322-1 to retrieve content information 385 such as content A11, content B11, display rules 11, etc. Logical path 304 represents such an access.

In a manner as discussed above, the content information retriever 370 retrieves the content information associated with the given contact from multiple services having a contact profile associated with the given contact. Based on the retrieved content information associated with the given contact, the preview generator 380 of content information aggregator 350 creates a corresponding view by communicating over network 101 with the subscriber system 110 as discussed above in FIG. 1.

FIG. 4 is a diagram illustrating examples of different preview configurations 400 and 405 that can be rendered by a content information aggregator according to embodiments herein. In general, the preview configuration 400 represents a view as generated by the content information aggregator enabling a subscriber 105 to view groupings of content information by service. As an alternative, the preview configuration 405 as generated by the content information aggregator enables a subscriber 105 to view groupings of the content information by content type. Thus, content information can be displayed on a per-contact basis or a per-content type basis.

More specifically, the first example preview configuration 400 includes a first column for indicating content information associated with contact 410-1 and a second column for indicating content information associated with contact 410-2. Each contact column is further delineated by the services subscribed to by each respective contact. For example, contact 410-1 includes corresponding regions for displaying content information retrieved from service 420-1 and service 420-2. Similarly, contact 410-2 includes corresponding regions for indicating content information retrieved from service 420-1 and content information retrieved from service 420-3.

In this non-limiting example, preview information 440-A, 440-B, 440-E and 440-F are of a content type 430-1 such as music; preview 440-C, 440-D, 440-G and 440-H are of a content type 430-2 such as photos; and, preview 440-J and 440-K are of a content type 430-3 such as videos. As shown, when content information associated with multiple contacts is shown in accordance with preview configuration 400, the content information is first categorized by service. Then for each service, the preview information is sorted and displayed by type.

Preview configuration 405 is similar to preview configuration 400 except that the content previews are not initially delineated by service. Instead, the content preview information is first assorted by type regardless of the service from which the corresponding content information is retrieved. This configuration may provide a more unified representation since the previews are grouped irrespective of the services from where they originated. It should be noted, however, that the associated service identity may still be indicated for respective preview information so that a view can identify from which service the preview information pertains.

Figure 5:
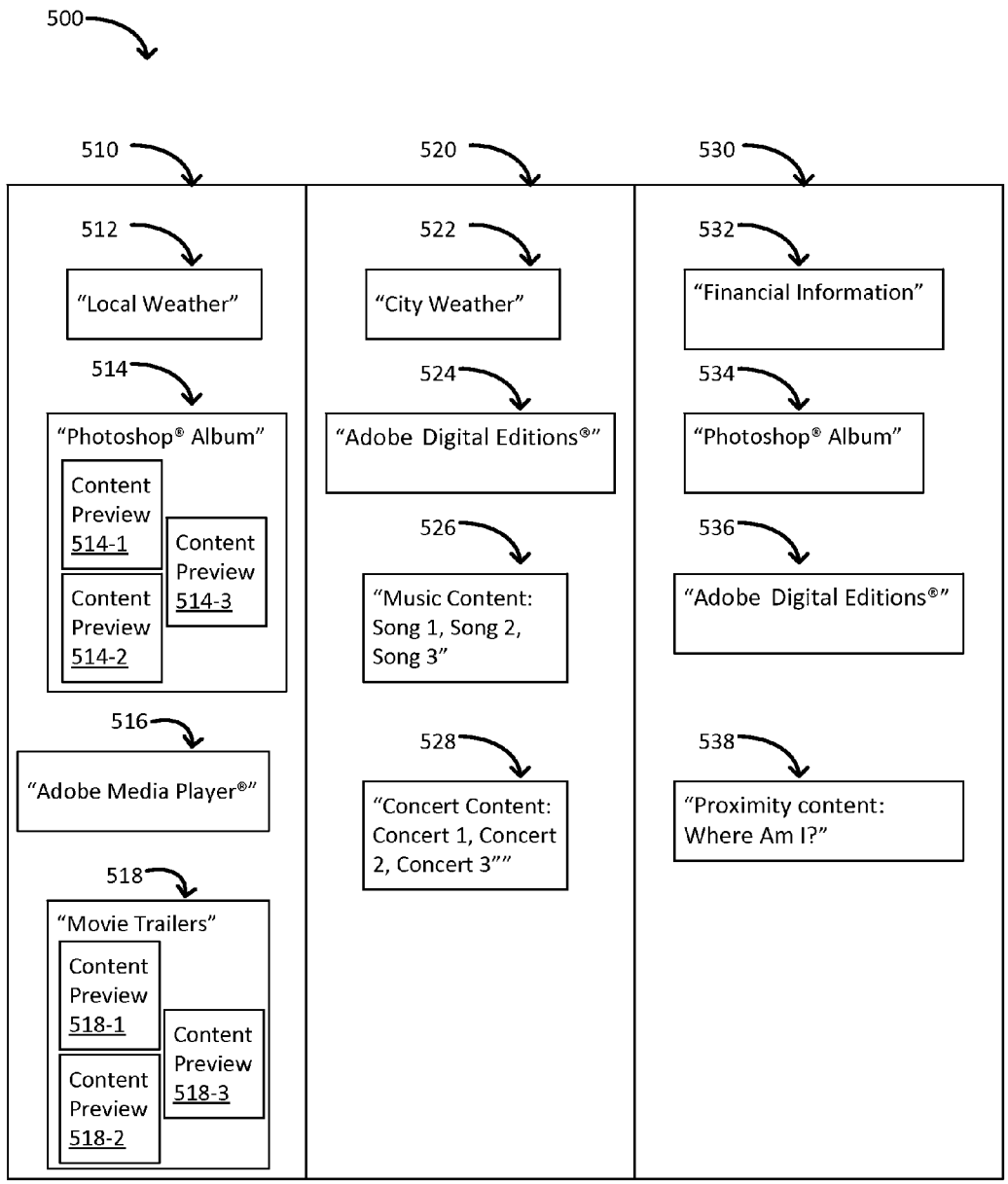
FIG. 5 is an example screenshot illustrating display of a preview identifying content associated with multiple contacts according to embodiments herein.

FIG. 5 is an example screenshot 500 generated by a content information aggregator according to embodiments herein. The screenshot 500 includes three preview columns of contact related information associated with three corresponding contacts. Each preview includes content type regions containing content aggregations for that particular content type.

More specifically, screenshot 500 includes first preview 510, second preview 520 and third preview 530. Preview 510 indicates content information associated with a first selected contact, preview 520 indicates content information associated with a second selected contact, preview 530 indicates content information associated with a third selected contact, and so on.

In one example embodiment, a subscriber 105 can select the three contacts such as Katerina, Sawyer, and Jonah, from the contact list 220 in order to invoke the corresponding previews for each contact in screenshot 500. Each of the previews 510, 520 and 530 can correspond to a different contact. For example, profile 510 can include information associated with Katerina Darling, profile 520 can include information associated with Sawyer Griffin, and profile 530 can include information associated with Jonah Hill.

Preview 510 displays content information associated with a first contact. By way of a non-limiting example, preview 510 includes first content type region 512 to display weather information, second content type region 514 to display PHOTOSHOP® content information, third content type region 516 to display ADOBE MEDIA PLAYER® content information, and fourth content type region 518 to display thumbnails of movie trailers.

Preview 520 displays content information associated with a second contact. By way of a non-limiting example, second preview 520 includes first content type region 522 to display weather information, second content type region 524 to display ADOBE DIGITAL EDITIONS® content, third content type region 526 to display music content, and fourth content type region 528 to display concert content.

Preview 530 displays content information associated with a third contact. By way of a non-limiting example, third preview 530 further includes first content type region to display financial information, second content type region 534 to display PHOTOSHOP® content, third content type region 536 to display ADOBE DIGITAL EDITIONS® content, and fourth content type region 538 to display proximity content.

As shown, each of profiles 510, 520 and 530 for different respective contacts in can include different types of content information in accordance with content information associated with the contacts at the different services.

Also note again that the content information in screenshot 500 is shown as a non-limiting example and that previews can vary depending on the information retrieved from the different services for the contacts. Thus, embodiments herein are not limited to the example configuration provided by screenshot 500 in FIG. 5.

In the present example, the display region 514 of preview 510 includes content preview 514-1, content preview 514-2, and content preview 514-3. Similarly, display region 518 of profile 510 includes content preview 518-1, content preview 518-2, and content preview 518-3.

Each of the content previews 514 and 518 correspond to content that is retrievable by the viewer clicking on the corresponding content preview. In other words, each preview can have a corresponding associated link in which to retrieve content as represented by the preview. Thus, underlying each selectable content preview can be a link to the content. Both the link and corresponding image displayed in a preview can be obtained from one of the multiple services.

Additionally, note that the services can provide content information specifying a remote location from which to retrieve content for display in screenshot 500. For example, the information displayed in preview 512 can include information from a remote website as specified by the content information for a given contact. Accordingly, each of the previews for different contacts can be generated based on content received from the services as well as other sources in a network.

Note that a service from where the content preview originated is typically, but not necessarily, one in which both the subscriber 105 and the different contacts have subscribed. In other words, a contact can select a number of favorite links to websites and/or content available on the Internet. As mentioned, this information can be displayed in the contact's profile page. Embodiments herein enable retrieval of information from the different services so that a respective subscriber 105 can more easily keep track and/or maintain of favorite content associated with the different contacts.

Note that in certain embodiments, the "collection" or "aggregation" command to obtain content information associated with one or more contacts isn't necessarily a direct command input by subscriber 105, but is rather more of a passive, pre-set "scheduled" setting whereby the content information aggregator performs aggregation of content information associated with one or more contacts on a regular or random basis such as once a day, once a week, etc. Thus, in such embodiments when aggregation occurs repeatedly over time as a result of scheduling, the subscriber 105 can be apprised of the most up-to-date contact information without having to repeatedly issue "collection" or "aggregation" commands to collect content information.

Such a scheduled setting can reside in the content information aggregator 150 or remotely with respect to the content 150. The scheduled settings can indicate the times in which the contact information manager 140 is to initiate communications with the multiple services 130.

By way of a non-limiting example, the user can configure the content information aggregator 150, via schedule settings, to automatically collect or aggregate contact information from the services 130 on a scheduled basis. In other words, a user can create a schedule indicating when to perform collection of content information associated with one or more contacts.

As an alternative non-limiting example, a source other than the user, such as a network administrator, scheduling policy, etc., can configure the content information aggregator 150 to automatically perform a collection or aggregation of contact information from the services 130 on a scheduled basis.

Figure 6:
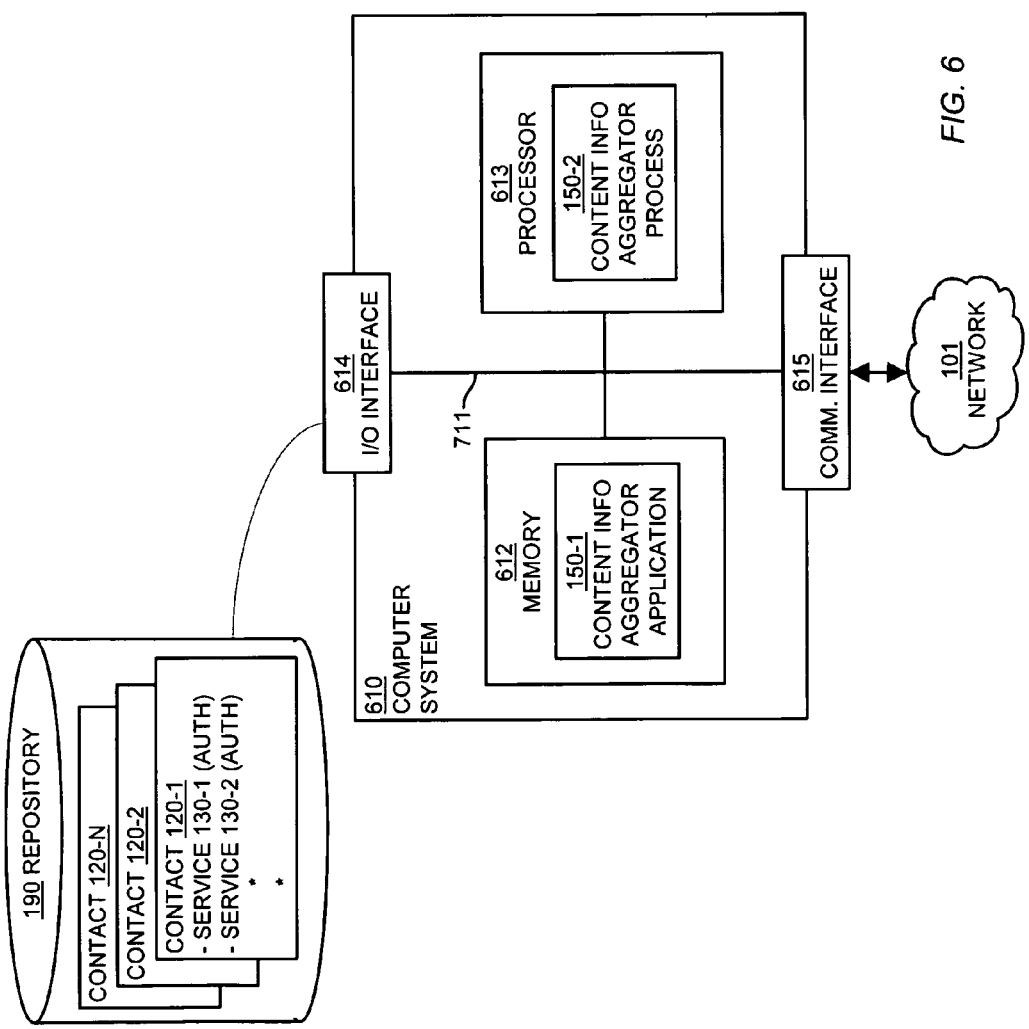
FIG. 6 is an example block diagram of a computer system configured with a processor and memory to execute methods and store instructions according to embodiments herein.

FIG. 6 is a block diagram of an example architecture of a respective computer system 610 such as one or more computers, processes, etc., for implementing a content information aggregator 150 according to embodiments herein. By way of a non-limiting example, computer system 610 can include one or more computerized devices such as personal computers, servers that make up a website, workstations, portable computing devices, consoles, network terminals, networks, processing devices, etc.

Note that the following discussion provides a basic embodiment indicating how to carry out functionality associated with the content information aggregator 150 as discussed above and below. However, it should be noted that the actual configuration for carrying out the content information aggregator 150 can vary depending on a respective environment. For example, as previously discussed, computer system 610 can include one or multiple computers that carry out the processing as described herein.

Note also that each of subscriber system 110, services 130, etc., as previously discussed also can be configured as one or more computers including a processor and corresponding instructions to carry out the operations as described herein.

As shown, computer system 610 of the present example includes an interconnect 611 that couples a memory system 612, a processor 613, I/O interface 614, and a communications interface 617.

I/O interface 614 provides connectivity to peripheral devices (if such devices are present) such as a keyboard, mouse, display screen, etc. In one embodiment, the computer system 610 is a server that manages and aggregates contact information and content information as described herein.

Communications interface 615 enables the content information aggregator process 150-2 of computer system 610 to communicate over network 101 to receive input from a subscriber, access content information associated with one or more contacts, initiate display of a content preview, etc.

As shown, memory system 612 is encoded with content information aggregator application 150-1 that supports functionality as discussed above and as discussed further below. Content information aggregator application 150-1 (and/or other resources as described herein) can be embodied as software code such as data and/or logic instructions such as code stored on a tangible computer readable medium, media, etc. Execution of the code supports processing functionality according to different embodiments described herein.

During operation of one embodiment, processor 613 accesses memory system 612 via the use of interconnect 611 in order to launch, run, execute, interpret or otherwise perform the logic instructions of the content information aggregator application 150-1. Execution of the content information aggregator application 150-1 produces processing functionality in content information aggregator process 150-2. In other words, the content information aggregator process 150-2 represents one or more portions of the content information aggregator 150 performing within or upon the processor 613 in the computer system 110.

It should be noted that, in addition to the content information aggregator process 150-2 that carries out method operations as discussed herein, other embodiments herein include the content information aggregator application 150-1 itself. The content information aggregator application 150-1 may be stored on a computer readable medium such as a floppy disk, hard disk or in an optical medium. According to other embodiments, the content information aggregator application 150-1 can also be stored in a memory type system such as in firmware, read only memory (ROM), or, as in this example, as executable code within the memory system 612. Memory system 612 can be configured as RAM (Random Access Memory).

In addition to these embodiments, it should also be noted that other embodiments herein include the execution of the content information aggregator application 150-1 in processor 613 as the content information aggregator process 150-2. Thus, those skilled in the art will understand that the computer system 610 can include other processes and/or software and hardware components, such as an operating system that controls allocation and use of hardware resources.

Functionality supported by computer system 610 and, more particularly, functionality associated with content information aggregator 150 will now be discussed via flowcharts in FIGS. 7 through 9. For purposes of the following discussion, the content information aggregator 150 or other appropriate entity generally performs steps in the flowcharts.

Figure 7:
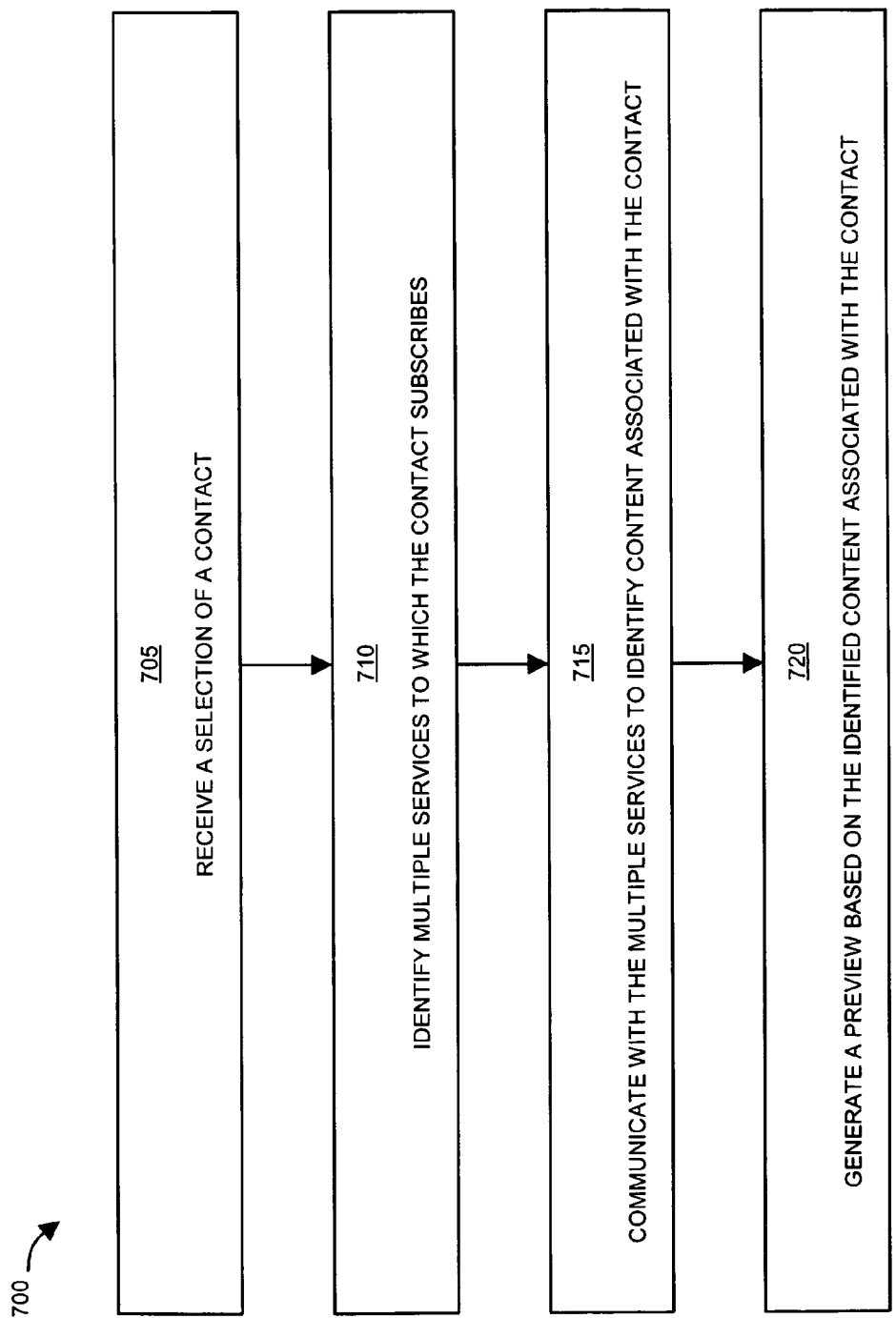

More particularly, FIG. 7 is an example flowchart 700 illustrating operations associated with a content information aggregator according to embodiments herein. Note that flowchart 700 of FIG. 7 and corresponding text below may overlap with and refer to some of the matter previously discussed with respect to FIGS. 1-6. Also, note that the steps in the below flowcharts need not always be executed in the order shown.

In step 705, the content information aggregator 150 receives a selection of a contact. For example, a user of the content aggreagator 150 can be presented with a list of from which to choose and, then, the user selects a specific contact from the contact list.

In step 710, content information aggregator 150 identifies multiple services to which the selected contact subscribes.

In step 715, the content information aggregator 150 communicates with the multiple services to identify content information associated with the contact. As previously mentioned, a services can include an Application Programming Interface (API) that enables the content information aggregator 150 to communicate with and access data from the services. As previously discussed, in one embodiment, the content information aggregator 150 logs onto a service using authentication information and accesses contact information as if the user had logged on themselves.

In step 720, the content information aggregator 150 generates a preview 187 to indicate the content associated with a selected contact.

Figure 8:
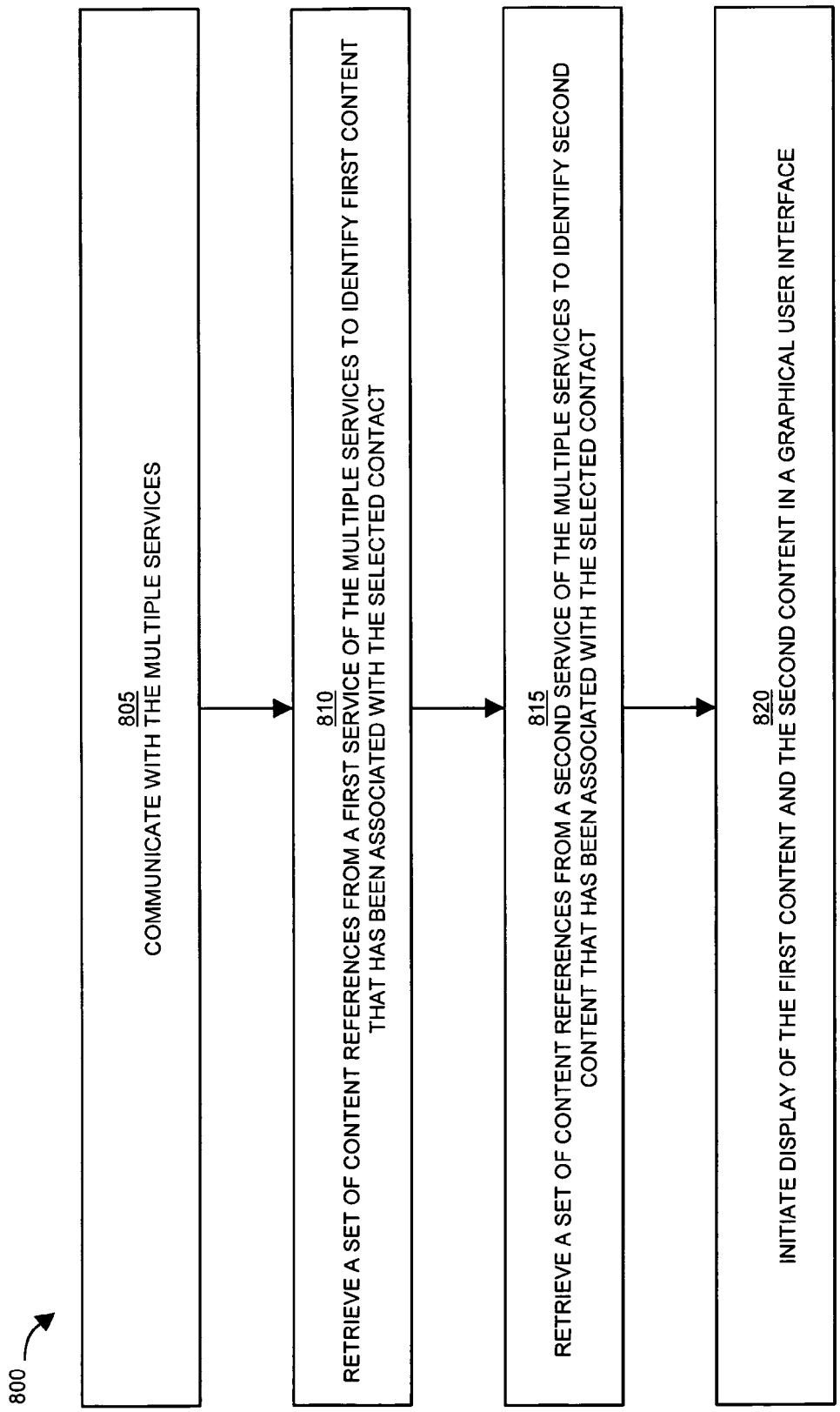

FIG. 8 is an example flowchart 800 illustrating operations associated with a content information aggregator 150 according to embodiments herein. Note that flowchart 800 of FIG. 8 and corresponding text below may overlap with and refer to some of the matter as previously discussed.

In step 805, the content information aggregator 150 communicates with the multiple services.

In step 810, the content information aggregator 150 retrieves a set of content information such as content, content references, etc., from a first service of the multiple services to identify first content associated with a selected contact.

In step 815, the content information aggregator 150 retrieves a set of content references such as content, content references, etc., from a second service of the multiple services to identify second content that has been associated with the selected contact.

In step 820, the content information aggregator 150 initiates display of preview information associated with the first content and preview information associated with the second content in a graphical user interface.

FIG. 9 is an example flowchart 900 illustrating one or more operations associated with a content information aggregator according to embodiments herein. Note that flowchart 900 of FIG. 9 and corresponding text below may overlap with and refer to some of the previous matter as discussed above.

In step 905, the content information aggregator 150 communicates with multiple services to retrieve content information associated with a selected contact.

In step 910, the content information aggregator 150 retrieves a first link from a first service of the multiple services. Assume that the first link points to a corresponding portion of content associated with the selected contact. By way of a non-limiting example, the first link can be a uniform resource locator.

In step 915, the content information aggregator 150 generates the preview.

In sub-step 920, the content information aggregator 150 renders the preview to include a first selectable display region.

In sub-step 925, the content information aggregator 150 associates the first link with the first selectable display region such that subsequent selection of the first display region enables retrieval and playback of the content via use of the first link. In other words, if a user selects the first display region in the preview, the content information aggregator 150 initiates retrieval of the content as specified by the first link. The content information aggregator 150 initiates playback in a graphical user interface.

Note that the content information aggregator can retrieve additional links from the services. For example, in furtherance of the embodiment above, the content information aggregator 150 can communicate with the multiple services to retrieve a second link from a second service of the multiple services. Assume that the second link points to another corresponding portion of content associated with the selected contact. Based on the second link, the content information aggregator 150 then generates the preview to include: a rendition of the window that includes a second selectable display region; and an association between the second link and the second selectable display region such that the subsequent selection of the second display region enables retrieval and playback of content via use of the second link. In this way, a preview window as generated by the content information aggregator can include any number of content references for respective contacts.

Those skilled in the art will understand that there can be many variations made to the operations of the user interface explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

What is claimed is:

1. A method comprising:
receiving, by a processor, a selection of a contact from a requestor;
identifying, by the processor, multiple services to which both the selected contact and the requestor subscribes, wherein subscribing to each service comprises creating a respective profile comprising authentication information and wherein at least one content item associated with the respective profile is provided by the service based on subscribing to the service, wherein identifying the multiple services comprises identifying, for each service, that a profile of the selected contact is associated with a profile of the requestor;
communicating, by the processor, with the multiple services to identify associated content, wherein the associated content is provided by at least one of the multiple services and is associated with the selected contact;
identifying, by the processor, that the selected contact has specified at least one first display rule for an aggregation application and that the requestor has specified at least one second display rule for the aggregation application, wherein each of the at least one first display rule and the at least one second display rule specify how the aggregation application is to display the associated content aggregated from the multiple services by the aggregation application in a preview included in a graphical interface of the aggregation application; and
generating, by the processor, the preview based on the at least one first display rule and the at least one second display rule, wherein the preview comprises at least some of the associated content aggregated by the aggregation application that is grouped based on a respective content type of the associated content;
displaying the preview in the graphical user interface of the aggregation application.

2. The method of claim 1, wherein communicating with the multiple services includes:
retrieving a first set of content references from a first service of the multiple services to identify first content that has been associated with the selected contact; and
retrieving a second set of content references from a second service of the multiple services to identify second content that has been associated with the selected contact;
wherein generating the preview includes initiating display of the first set of content references to the first content and the second set of content references to the second content in the graphical interface.

3. The method of claim 2, wherein the selected contact is a first contact, the method further comprising:
receiving, by the processor, a selection of a second contact; and
communicating, by the processor, with at least one of the first service and the second service to retrieve an additional set of content references associated with the second contact, wherein the additional set of content references specifies additional content;
wherein generating the preview includes initiating display of the additional content along with the first content and second content in the graphical interface.

4. The method of claim 1,
wherein communicating with the multiple services includes retrieving a link from at least one service of the multiple services, the link pointing to a corresponding portion of the associated content; and
wherein generating the preview includes:
rendering the preview to include a selectable display region,
associating the link with the selectable display region,
receiving a subsequent selection of the selectable display region enabling retrieval and playback of the associated content via use of the link.

5. The method of claim 4,
wherein communicating with the multiple services includes retrieving an additional link from an additional service of the multiple services, the additional link pointing to an additional corresponding portion of the associated content; and
wherein generating the preview includes:
rendering the preview to include an additional selectable display region; and
associating the additional link with the additional selectable display region, a subsequent selection of the additional display region enabling retrieval and playback of the associated content via use of the additional link.

6. The method of claim 1, wherein communicating with the multiple services includes:
providing requestor authentication information to a service, wherein the requestor authentication information is associated with the profile of the requestor and is specific to the service; and
generating the preview by accessing content information that is provided by the service and that is associated with the selected contact.

7. The method of claim 1, wherein generating the preview includes:
displaying references to the associated content such that a first region of the preview includes at least one first reference to first content associated with a first content type and a second region of the preview includes at least one second reference to second content associated with a second content type.

8. The method of claim 7, wherein generating the preview further comprises sub-grouping the references to the associated content based on, for each reference, a respective service providing the respective content via the references, wherein the references are also displayed based on sub-grouping the references.

9. The method of claim 1 further comprising:
initiating, by the processor, display of the associated content in the preview according to an identification of preferred content as specified by the at least one first display rule and the at least one second display rule.

10. The method of claim 1 further comprising:
receiving, by the processor, a selection of a content reference displayed in the preview, the content reference specifying at least a portion of the associated content;
in response to receiving the selection of the content reference, initiating, by the processor, retrieval of corresponding associated content; and displaying, by the processor, a rendition of the corresponding associated content in the graphical interface.

11. The method as in claim 1, wherein communicating with the multiple services includes:
retrieving first content information from a first web-based social networking service to which the selected contact subscribes, wherein the first content information is associated with the selected contact, wherein the first content information comprises a first link to a first portion of the associated content; and
retrieving second content information from a second web-based social networking service to which the selected contact subscribes, wherein the second content information is associated with the selected contact, wherein the second content information comprises a second link to a second portion of the associated content.

12. The method as in claim 11, wherein generating the preview includes:
initiating display of a first selectable display region in the preview, the first selectable display region representing the first portion of the associated content; and
initiating display of a second selectable display region in the preview, the second selectable display region representing the second portion of the associated content.

13. The method as in claim 12 further comprising:
associating, by the processor, the first link with the first selectable display region;
associating, by the processor, the second link with the second selectable display region;
in response to detecting selection of the first selectable display region in the preview, utilizing, by the processor, the first link to retrieve and display the first portion of the associated content; and
in response to detecting selection of the second selectable display region in the preview, utilizing, by the processor, the second link to retrieve and display the second portion of the associated content.

14. A computer program product including a non-transitory computer-readable medium having instructions stored thereon for processing data information, such that the instructions, when carried out by a processing device, cause the processing device to perform operations of:
receiving a selection of a contact from a requestor;
identifying multiple services to which both the selected contact and the requestor subscribe, wherein subscribing to each service comprises creating a respective profile comprising authentication information and wherein at least one content item associated with the respective profile is provided by the service based on subscribing to the service, wherein identifying the multiple services comprises identifying, for each service, that a profile of the contact is associated with a profile of the requestor;
communicating with the multiple services to identify associated content, wherein the associated content is provided by at least one of the multiple services and that is associated with the contact;
identifying, by the processor, that the selected contact has specified at least one first display rule for an aggregation application and that the requestor has specified at least one second display rule for the aggregation application, wherein each of the at least one first display rule and the at least one second display rule specify how the aggregation application is to display the associated content aggregated from the multiple services by the aggregation application in a preview included in a graphical interface of the aggregation application; and
generating the preview based on the at least one first display rule and the at least one second display rule, wherein the preview comprises at least some of the associated content that is grouped based on a respective content type of the associated content;
displaying the preview in the graphical user interface of the aggregation application.

15. The computer program product as in claim 14, wherein communicating with the multiple services includes:
retrieving a first set of content references from a first service of the multiple services to identify first content associated with the contact; and
retrieving a second set of content references from a second service of the multiple services to identify second content associated with the contact;
wherein generating the preview includes initiating display of the first set of references to the first content and the second set of content references to the second content in the graphical interface.

16. The computer program product as in claim 14,
wherein communicating with the multiple services includes retrieving a link from at least one service of the multiple services, the link pointing to a corresponding portion of the associated content associated with the selected contact; and
wherein generating the preview includes:
rendering the preview to include a selectable display region,
associating the link with the selectable display region,
receiving a selection of the selectable display region enabling retrieval and playback of the associated content via use of the link.

17. The computer program product as in claim 16,
wherein communicating with the multiple services includes retrieving an additional link from an additional service of the multiple services, the additional link pointing to an additional corresponding portion of the associated content; and
wherein generating the preview includes:
rendering the preview to include an additional selectable display region; and
associating the additional link with the additional selectable display region, a subsequent selection of the additional display region enabling retrieval and playback of the associated content via use of the additional link.

18. A computer system comprising:
a processor;
a memory unit that stores instructions associated with an application executed by the processor; and
an interconnect coupling the processor and the memory unit, enabling the computer system to execute the application and perform operations of:
receiving a selection of a contact from a requestor;
identifying multiple services to which both the selected contact and the requestor subscribe, wherein subscribing to each service comprises creating a respective profile comprising authentication information and wherein at least one content item associated with the respective profile are provided by the service based on subscribing to the service, wherein identifying the multiple services comprises identifying, for each service, that a profile of the selected contact is associated with a profile of the requestor;
communicating with the multiple services to identify associated content, wherein the associated content is provided by at least one of the multiple services and that is associated with the selected contact;

identifying, by the processor, that the selected contact has specified at least one first display rule for an aggregation application and that the requestor has specified at least one second display rule for the aggregation application, wherein each of the at least one first display rule and the at least one second display rule specify how the aggregation application is to display the associated content aggregated from the multiple services by the aggregation application in a preview included in a graphical interface of the aggregation application; and generating a preview based on the at least one first display rule and the at least one second display rule, wherein the preview comprises at least some of the associated content that is grouped based on a respective content type of the associated content;

displaying the preview in the graphical user interface of the aggregation application.

19. The computer system of claim 18, wherein communicating with the multiple services includes:

retrieving a first set of content references from a first service of the multiple services to identify first content that has been associated with the selected contact;

retrieving a second set of content references from a second service of the multiple services to identify second content that has been associated with the selected contact; and wherein generating the preview includes initiating display of the first set of references to the first content and the second set of content references to the second content in the graphical interface.

20. The computer system of claim 19, wherein the selected contact is a first contact, the computer system further supporting operations of:

receiving a selection of a second contact;

communicating with at least one of the first service and the second service to retrieve an additional set of content references associated with the second contact, wherein the additional set of content references specifies additional content, wherein the additional content is associated with the selected contact; and wherein generating the preview includes initiating display of references to the additional content in the graphical interface.

21. The computer system of claim 18, wherein communicating with the multiple services includes retrieving the associated content from one of the multiple services; and wherein generating the preview includes initiating display of the associated content as retrieved from the one of the multiple services.

\* \* \* \* \*